US012659962B2

(12) United States Patent
Bagheri et al.

(10) Patent No.: US 12,659,962 B2
(45) Date of Patent: Jun. 16, 2026

(54) METHOD AND APPARATUS FOR MANAGING MULTIPLE SETS OF TRANSMISSION CONFIGURATION INDICATOR STATES

(71) Applicant: Lenovo (Singapore) Pte. Ltd., New Tech Park (SG)

(72) Inventors: Hossein Bagheri, Urbana, IL (US); Vijay Nangia, Woodridge, IL (US); Hyejung Jung, Northbrook, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 417 days.

(21) Appl. No.: 17/764,890

(22) PCT Filed: Nov. 9, 2020

(86) PCT No.: PCT/IB2020/060538
§ 371 (c)(1),
(2) Date: Mar. 29, 2022

(87) PCT Pub. No.: WO2021/090297
PCT Pub. Date: May 14, 2021

(65) Prior Publication Data
US 2022/0338235 A1 Oct. 20, 2022

Related U.S. Application Data

(60) Provisional application No. 62/933,336, filed on Nov. 8, 2019.

(51) Int. Cl.
*H04L 5/00* (2006.01)
*H04B 7/06* (2006.01)
(Continued)

(52) U.S. Cl.
CPC ........... *H04W 72/23* (2023.01); *H04L 5/0044* (2013.01); *H04L 5/0094* (2013.01); *H04W 72/1263* (2013.01)

(58) Field of Classification Search
CPC . H04W 72/23; H04W 72/1273; H04W 48/12; H04W 72/20; H04W 74/0866;
(Continued)

(56) References Cited

U.S. PATENT DOCUMENTS

2015/0249974 A1 9/2015 Lee et al.
2019/0044646 A1* 2/2019 Xu .......................... H04L 27/36
(Continued)

FOREIGN PATENT DOCUMENTS

| CN | 104737479 | A | 6/2015 |
| CN | 114788208 | A | 7/2022 |
| EP | 4331271 | A1 | 3/2024 |

OTHER PUBLICATIONS

PCT International Search Report for PCT/IB2020/060538, Lenovo (Singapore) Pte. Ltd., mailing date—Feb. 16, 2021.
(Continued)

*Primary Examiner* — Marcus Smith
*Assistant Examiner* — Jason A Harley
(74) *Attorney, Agent, or Firm* — FIG. 1 Patents

(57) ABSTRACT

A method and apparatus are provided, in which an activation command is received (402), which indicates a first set of transmission configuration indicator (TCI) states to select between, which are to be used with transmissions scheduled using a first downlink control information (DCI) format. A number of states included in the first set corresponds to a selection field associated with the first DCI format having a first size. A second set of TCI states to select between, which are to be used with transmissions scheduled using a second DCI format is determined (404). A number of states included
(Continued)

in the second set corresponds to a selection field associated with the second DCI format having a second size, where the second size is different than the first size. Transmissions scheduled using the second DCI format are received (406).

22 Claims, 6 Drawing Sheets

(51) Int. Cl.

| | |
|---|---|
| *H04B 7/08* | (2006.01) |
| *H04W 24/10* | (2009.01) |
| *H04W 72/04* | (2023.01) |
| *H04W 72/1263* | (2023.01) |
| *H04W 72/23* | (2023.01) |

(58) Field of Classification Search

CPC ... H04W 76/11; H04W 52/146; H04W 76/27; H04W 72/232; H04L 1/1887; H04B 7/0639

USPC .................................................. 370/252, 329

See application file for complete search history.

(56) References Cited

U.S. PATENT DOCUMENTS

| | | | | |
|---|---|---|---|---|
| 2019/0222284 | A1* | 7/2019 | Huang | H04W 72/23 |
| 2019/0297603 | A1 | 9/2019 | Guo et al. | |
| 2019/0342907 | A1 | 11/2019 | Huang et al. | |
| 2019/0394793 | A1* | 12/2019 | Venugopal | H04L 1/1825 |
| 2020/0015200 | A1* | 1/2020 | Vilaipornsawai | H04W 72/23 |
| 2020/0029315 | A1* | 1/2020 | Lin | H04W 52/0216 |
| 2020/0077428 | A1* | 3/2020 | Zhou | H04L 5/0023 |
| 2020/0120644 | A1* | 4/2020 | Zhou | H04B 7/0689 |
| 2020/0178272 | A1* | 6/2020 | Khoshnevisan | H04W 72/1263 |
| 2020/0314880 | A1* | 10/2020 | Cirik | H04W 72/1273 |
| 2020/0351892 | A1* | 11/2020 | Yi | H04L 5/0092 |
| 2021/0219336 | A1* | 7/2021 | Fan | H04B 7/0695 |
| 2021/0258936 | A1* | 8/2021 | Takeda | H04L 5/0094 |
| 2022/0022065 | A1* | 1/2022 | Wang | H04W 24/08 |
| 2025/0220679 | A1 | 7/2025 | Bagheri et al. | |

OTHER PUBLICATIONS

3GPP TS 38.212 V15.0.0 (Dec. 2017), 3rd Generation Partnership Project; Technical Specification Group Radio Access Network; NR; Multiplexing and channel coding (Release 15).

3GPP TS 38.212 V15.7.0 (Sep. 2019), 3rd Generation Partnership Project; Technical Specification Group Radio Access Network; NR; Multiplexing and channel coding (Release 15).

3GPP TS 38.213 V15.7.0 (Sep. 2019), 3rd Generation Partnership Project; Technical Specification Group Radio Access Network; NR; Physical layer procedures for control (Release 15).

3GPP TS 38.214 V15.0.0 (Dec. 2017), 3rd Generation Partnership Project; Technical Specification Group Radio Access Network; NR; Physical layer procedures for data (Release 15).

3GPP TS 38.214 V15.7.0 (Sep. 2019), 3rd Generation Partnership Project; Technical Specification Group Radio Access Network; NR; Physical layer procedures for data (Release 15).

3GPP TS 38.306 V15.7.0 (Sep. 2019), 3rd Generation Partnership Project; Technical Specification Group Radio Access Network; NR; User Equipment (UE) radio access capabilities (Release 15).

3GPP TS 38.321 V15.7.0 (sep. 2019), 3rd Generation Partnership Project; Technical Specification Group Radio Access Network; NR; Medium Access Control (MAC) protocol specification (Release 15).

3GPP TS 38.331 V15.7.0 (Sep. 2019), 3rd Generation Partnership Project; Technical Specification Group Radio Access Network; NR; Radio Resource Control (RRC) protocol specification (Release 15).

List of References Cited—CN Office Action for CN Appln. 202080068107.3, Lenovo (Singapore) Pte. Ltd., dated—Sep. 14, 2023, part of Office Action mailed Sep. 15, 2023.

* cited by examiner

300

| | | | | | | | |
|---|---|---|---|---|---|---|---|
| R | | | SERVING CELL ID | | | | BWP ID | OCT 1 |
| $T_7$ | $T_6$ | $T_5$ | $T_4$ | $T_3$ | $T_2$ | $T_1$ | $T_0$ | OCT 2 |
| $T_{15}$ | $T_{14}$ | $T_{13}$ | $T_{12}$ | $T_{11}$ | $T_{10}$ | $T_9$ | $T_8$ | OCT 3 |

$\bullet$
$\bullet$
$\bullet$

| | | | | | | | |
|---|---|---|---|---|---|---|---|
| $T_{(N-2)X8+7}$ | $T_{(N-2)X8+6}$ | $T_{(N-2)X8+5}$ | $T_{(N-2)X8+4}$ | $T_{(N-2)X8+3}$ | $T_{(N-2)X8+2}$ | $T_{(N-2)X8+1}$ | $T_{(N-2)X8}$ | OCT N |

START

402 — RECEIVING AN ACTIVATION COMMAND INDICATING A FIRST SET OF TRANSMISSION CONFIGURATION INDICATOR STATES TO SELECT BETWEEN, WHICH ARE TO BE USED WITH TRANSMISSIONS SCHEDULED USING A FIRST DOWNLINK CONTROL INFORMATION FORMAT, WHERE A NUMBER OF STATES INCLUDED IN THE FIRST SET CORRESPONDS TO A SELECTION FIELD ASSOCIATED WITH THE FIRST DOWNLINK CONTROL INFORMATION FORMAT HAVING A FIRST SIZE, WHICH CORRESPONDS TO A NUMBER OF DISCRETE ENTRIES THAT THE SELECTION FIELD HAVING THE FIRST SIZE IS CAPABLE OF SELECTING BETWEEN

404 — DETERMINING A SECOND SET OF TRANSMISSION CONFIGURATION INDICATOR STATES TO SELECT BETWEEN, WHICH ARE TO BE USED WITH TRANSMISSIONS SCHEDULED USING A SECOND DOWNLINK CONTROL INFORMATION FORMAT, WHERE A NUMBER OF STATES INCLUDED IN THE SECOND SET CORRESPONDS TO A SELECTION FIELD ASSOCIATED WITH THE SECOND DOWNLINK CONTROL INFORMATION FORMAT HAVING A SECOND SIZE, WHERE THE SECOND SIZE IS DIFFERENT THAN THE FIRST SIZE, WHICH CORRESPONDS TO A NUMBER OF DISCRETE ENTRIES THAT THE SELECTION FIELD HAVING THE SECOND SIZE IS CAPABLE OF SELECTING BETWEEN

406 — RECEIVING TRANSMISSIONS SCHEDULED USING THE SECOND DOWNLINK CONTROL INFORMATION FORMAT USING A SELECTED ONE OF THE TRANSMISSION CONFIGURATION INDICATOR STATES INCLUDED IN THE SECOND SET

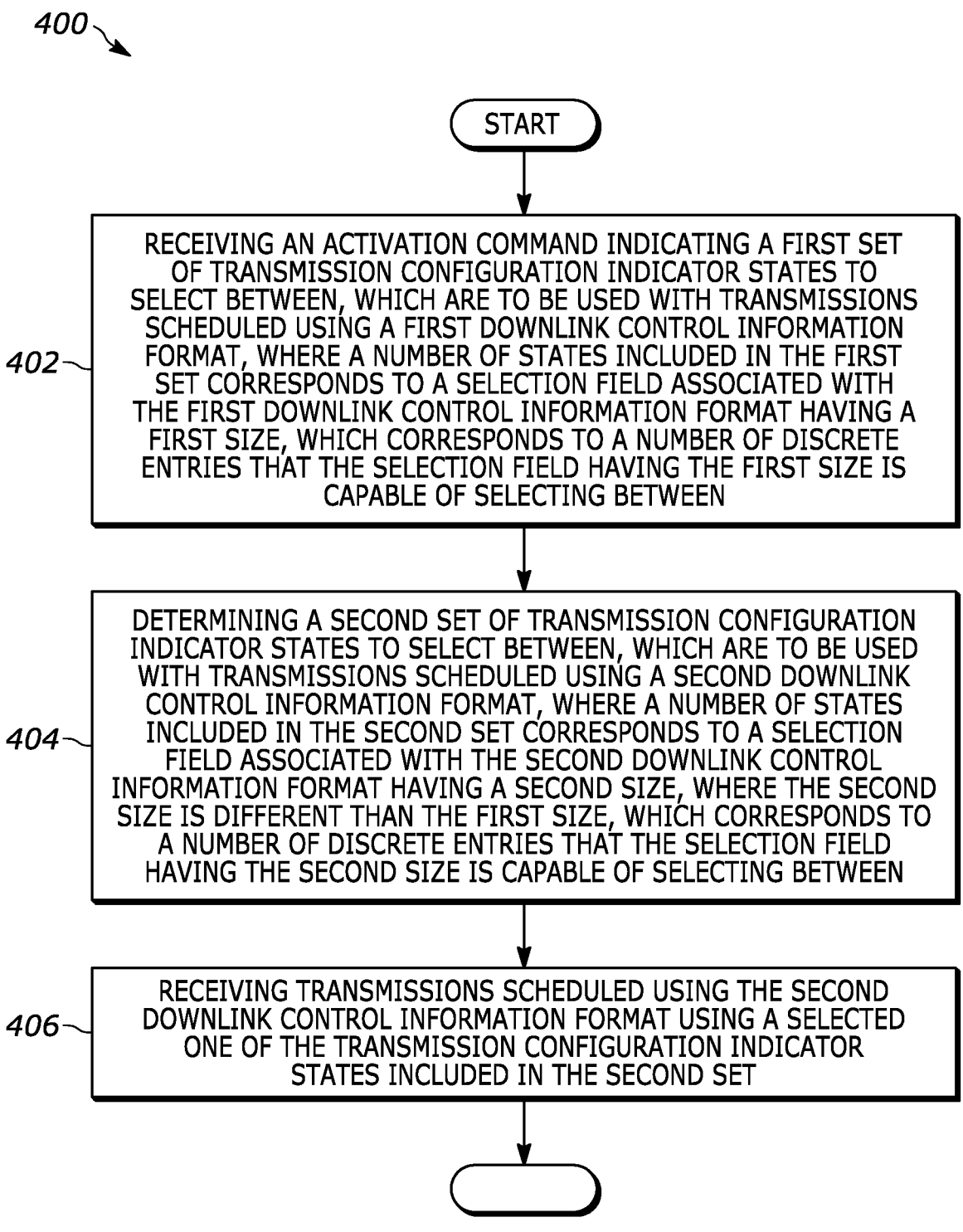

FIG. 4

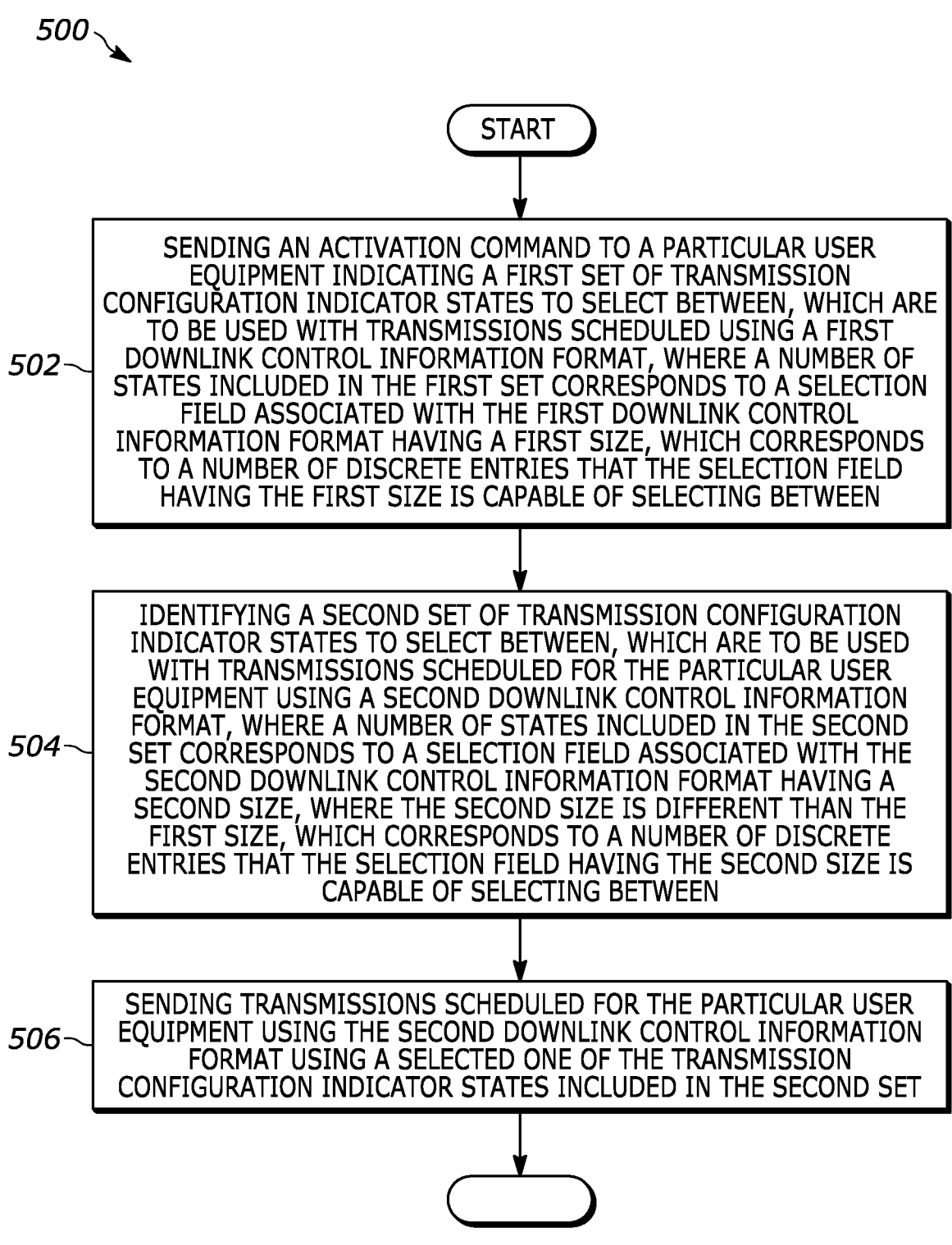

500

START

502 — SENDING AN ACTIVATION COMMAND TO A PARTICULAR USER EQUIPMENT INDICATING A FIRST SET OF TRANSMISSION CONFIGURATION INDICATOR STATES TO SELECT BETWEEN, WHICH ARE TO BE USED WITH TRANSMISSIONS SCHEDULED USING A FIRST DOWNLINK CONTROL INFORMATION FORMAT, WHERE A NUMBER OF STATES INCLUDED IN THE FIRST SET CORRESPONDS TO A SELECTION FIELD ASSOCIATED WITH THE FIRST DOWNLINK CONTROL INFORMATION FORMAT HAVING A FIRST SIZE, WHICH CORRESPONDS TO A NUMBER OF DISCRETE ENTRIES THAT THE SELECTION FIELD HAVING THE FIRST SIZE IS CAPABLE OF SELECTING BETWEEN

504 — IDENTIFYING A SECOND SET OF TRANSMISSION CONFIGURATION INDICATOR STATES TO SELECT BETWEEN, WHICH ARE TO BE USED WITH TRANSMISSIONS SCHEDULED FOR THE PARTICULAR USER EQUIPMENT USING A SECOND DOWNLINK CONTROL INFORMATION FORMAT, WHERE A NUMBER OF STATES INCLUDED IN THE SECOND SET CORRESPONDS TO A SELECTION FIELD ASSOCIATED WITH THE SECOND DOWNLINK CONTROL INFORMATION FORMAT HAVING A SECOND SIZE, WHERE THE SECOND SIZE IS DIFFERENT THAN THE FIRST SIZE, WHICH CORRESPONDS TO A NUMBER OF DISCRETE ENTRIES THAT THE SELECTION FIELD HAVING THE SECOND SIZE IS CAPABLE OF SELECTING BETWEEN

506 — SENDING TRANSMISSIONS SCHEDULED FOR THE PARTICULAR USER EQUIPMENT USING THE SECOND DOWNLINK CONTROL INFORMATION FORMAT USING A SELECTED ONE OF THE TRANSMISSION CONFIGURATION INDICATOR STATES INCLUDED IN THE SECOND SET

FIG. 5

METHOD AND APPARATUS FOR MANAGING MULTIPLE SETS OF TRANSMISSION CONFIGURATION INDICATOR STATES

FIELD OF THE INVENTION

The present disclosure is directed to managing multiple sets of transmission configuration indicator states, including the selection between multiple possible indicator states and the identification or determination of associated transmission parameters.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to support greater data throughputs, service providers have been increasingly looking at techniques which extend the available bandwidth that is allowed to be used by a particular user within the system. At least one technique allows for spatial characteristics associated with a particular signal to be used to distinguish between multiple different channels that share at least some carrier frequencies and/or time slots. The spatial characteristics that can be used to distinguish between different channels can result from the use of one or more separate antenna elements at the source and/or the destination of the particular communication. This can sometimes include a type of communication known as multiple input multiple output or MIMO. Each of the separate antenna elements can be related to a corresponding transmission/reception point, and each transmission/reception point potentially has a unique set of conditions that need to be identified and used relative to the transmission and receipt of information. In some cases, where the various antenna elements are considered as being quasi-colocated, some or all of the information related to a particular transmission/reception point may be reused or shared with another one of the transmission/reception points. Radio characteristics that can sometimes be shared and/or are common across different transmission/reception points can include Doppler shift, Doppler spread, average delay, delay spread and/or spatial receiver parameters, such as properties associated with an angle of arrival, relative to a particular communication participant.

Information that is common and/or can be shared between multiple transmission/reception points can sometimes be identified through the use of one or more transmission configuration indicator states. The use of a corresponding transmission configuration indicator state may allow for the amount of information to be newly determined for a particular transmission/reception point to be reduced, as the communication participant may be able to reuse or share previously identified information already determined relative to another transmission/reception point.

Further, the number of possible transmission configuration indicator states that may be maintained in a possible communication participant, such as a user equipment may be greater than one, but also limited relative to a predefined finite value. There may be instances in which it will be helpful to be able to select between the multiple transmission configuration indicator states presently being maintained. Still further the number of different transmission configuration indicator states that may be able to be differentiated for different types of communications may be different, and so an approach that can be used to account for such differences may be helpful.

The present inventor have recognized that it may be beneficial to be able to define and maintain multiple sets of transmission configuration indicator states, as well as manage the selection of a particular one of the transmission configuration indicator states for each of the respectively defined and/or determined sets including instances in which the number of included indicator states may differ between the multiple maintained sets.

SUMMARY

The present application provides a method. The method includes receiving an activation command, which indicates a first set of transmission configuration indicator states to select between, and which are to be used with transmissions scheduled using a first downlink control information format. A number of states included in the first set corresponds to a selection field associated with the first downlink control information format having a first size, which corresponds to a number of discrete entries that the selection field having the first size is capable of selecting between. A second set of transmission configuration indicator states to select between, which are to be used with transmissions scheduled using a second downlink control information format is determined. A number of states included in the second set corresponds to a selection field associated with the second downlink control information format having a second size, where the second size is different than the first size, which corresponds to a number of discrete entries that the selection field having the second size is capable of selecting between. Transmissions scheduled using the second downlink control information format, which use a selected one of the transmission configuration indicator states included in the second set are received.

According to another possible embodiment, a user equipment is provided. The user equipment includes a transceiver that receives an activation command indicating a first set of transmission configuration indicator states to select between, which are to be used with transmissions scheduled using a first downlink control information format, where a number of states included in the first set corresponds to a selection field associated with the first downlink control information format having a first size, which corresponds to a number of discrete entries that the selection field having the first size is capable of selecting between. The user equipment further includes a controller that determines a second set of transmission configuration indicator states to select between, which are to be used with transmissions scheduled using a second downlink control information format, where a number of states included in the second set corresponds to a selection field associated with the second downlink control information format having a second size, where the second size is different than the first size, which corresponds to a number of discrete entries that the selection field having the second size is capable of selecting between. Transmissions scheduled using the second downlink control information format using a selected one of the transmission configuration indicator states included in the second set are received via the transceiver.

According to a further possible embodiment, a method in a network entity is provided. The method includes sending an activation command to a particular user equipment indicating a first set of transmission configuration indicator states to select between, which are to be used with transmissions scheduled using a first downlink control information format. A number of states included in the first set corresponds to a selection field associated with the first downlink control information format having a first size, which corresponds to a number of discrete entries that the selection field having the first size is capable of selecting between. A second set of transmission configuration indicator states to select between, which are to be used with transmissions scheduled for the particular user equipment using a second downlink control information format is identified. A number of states included in the second set corresponds to a selection field associated with the second downlink control information format having a second size, where the second size is different than the first size, which corresponds to a number of discrete entries that the selection field having the second size is capable of selecting between. Transmissions scheduled for the particular user equipment using the second downlink control information format are sent using a selected one of the transmission configuration indicator states included in the second set.

According to a still further possible embodiment, a network entity is provided. The network entity includes a transceiver that sends an activation command to a particular user equipment indicating a first set of transmission configuration indicator states to select between, which are to be used with transmissions scheduled using a first downlink control information format. A number of states included in the first set corresponds to a selection field associated with the first downlink control information format having a first size, which corresponds to a number of discrete entries that the selection field having the first size is capable of selecting between. The network entity further includes a controller that identifies a second set of transmission configuration indicator states to select between, which are to be used with transmissions scheduled for the particular user equipment using a second downlink control information format. A number of states included in the second set corresponds to a selection field associated with the second downlink control information format having a second size, where the second size is different than the first size, which corresponds to a number of discrete entries that the selection field having the second size is capable of selecting between. Transmissions scheduled for the particular user equipment using the second downlink control information format using a selected one of the transmission configuration indicator states included in the second set are sent via the transceiver.

These and other objects, features, and advantages of the present application are evident from the following description of one or more preferred embodiments, with reference to the accompanying drawings.

BRIEF DESCRIPTION OF THE DRAWINGS

FIG. 3 is a table, which identifies the structure of the transmission configuration indicator states activation/deactivation for user equipment specific physical downlink shared channel medium access control-control entity, identified in 3GPP technical specification 38.321;

FIG. 4 is a flow diagram in a user equipment for managing multiple sets of transmission configuration indicator states;

FIG. 5 is a flow diagram in a user equipment for managing multiple sets of transmission configuration indicator states.

DETAILED DESCRIPTION OF THE PREFERRED EMBODIMENT(S)

Figure 1:
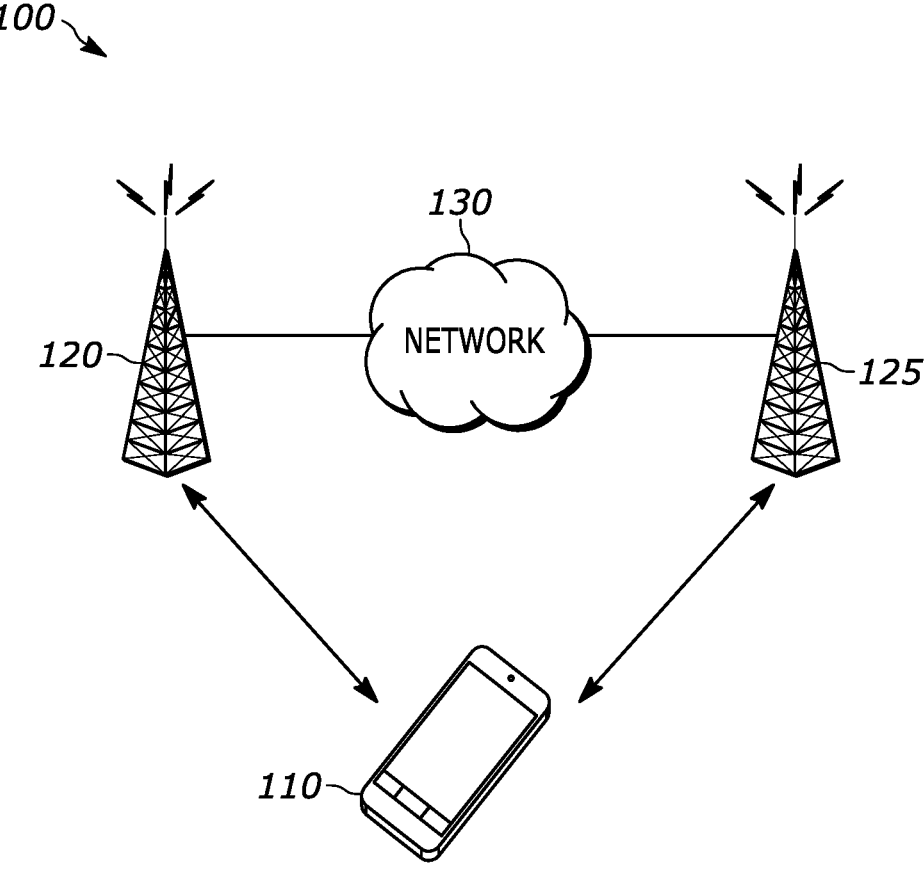
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments can provide for the management of multiple sets of transmission configuration indicator states, in support of communications between user equipment and a communication network, which can include a provision for the determination of transmission parameters, such as for communications, which can include instances involving ultra-reliable low-latency communications.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In Rel-15,

A medium access control-control entity (MAC-CE) activates/deactivates transmission configuration indicator (TCI) states (among a set of configured TCI states) for physical downlink shared channel (PDSCH) operation, and a downlink control information (DCI) scheduling a PDSCH indicates one codepoint of the DCI field 'Transmission Configuration Indication' to be applicable to the scheduled PDSCH. Rel-15 DCI format 1-1 has a 3-bit field in DCI, if configured, to indicate TCI state for the scheduled PDSCH as defined in Subclause 5.1.5 of 3rd generation partnership project (3GPP) technical specification (TS) 38.214.

In Rel-16 new DCI formats for uplink (UL) (e.g., DCI format 0-2) and downlink (DL) (e.g., DCI format 1-2) scheduling of ultra reliable low latency communication (URLLC) traffic are introduced. Many DCI fields of URLLC DCI format have configurable field size, including transmission configuration index (TCI) field.

In Rel-15, a single configured grant can be active at a time for a bandwidth part (BWP) of a carrier. The initial transmission of a transport block for UL transmissions with configured grant with periodicity 'P' and 'K' repetitions may start at a transmission occasion corresponding to redundancy version (RV) 0 (based on a configured RV sequence, and order of transmission occasions within a period (of periodicity 'P') can have a different RV index), with some exceptions defined in 3GPP TS 38.214.

In Rel-16, multiple configured grants can be active at the same time. Rel-16 also supports UL cancellation indication (ULCI) with which the network can send an ULCI to cancel an eMBB transmission (associated with dynamic or configured grant). Rel-16 introduce a radio resource control (RRC) signaling per configured grant (CG) configuration to enable/disable the feature of starting from any RV0 occasion for RV cyclic sequences {0,0,0,0} and {0,3,0,3}.

The present filing provides mechanisms to determine:

active TCI states for PDSCH transmissions scheduled via DCI format 1-2 (e.g., when search spaces for monitoring DCI formats1-1 and 1-2 share the same control resource set (CORESET)) in case the TCI indication field size for DCI format 1-2 is smaller than 3 (1 or 2) bits.

transmission occasion for initial transmission of a transport block (TB) when UL cancellation indication is received for a configured grant physical uplink shared channel (PUSCH) transmission.

TCI Indication Aspects

Relevant aspects for Rel-15 operation are associated with 3GPP TS 38.214 and TS 38.321. More specifically, select portions of TS 38.214 provide, as follows.

TCI State Indication Aspects from TS 38.214

The UE can be configured with a list of up to M TCI-State configurations within the higher layer parameter PDSCH-Config to decode PDSCH according to a detected physical downlink control channel (PDCCH) with DCI intended for the UE and the given serving cell, where M depends on the UE capability maxNumberConfiguredTCIstatesPerCC. Each TCI-State contains parameters for configuring a quasi co-location relationship between one or two downlink reference signals and the demodulation reference signal (DM-RS) ports of the PDSCH, the DM-RS port of PDCCH or the channel state indicator-reference signal (CSI-RS) port(s) of a CSI-RS resource. The quasi co-location (QCL) relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command, as described in subclause 6.1.3.14 of [10, TS 38.321], used to map up to 8 TCI states to the codepoints of the DCI field 'Transmission Configuration Indication'. When the HARQ-ACK corresponding to the PDSCH carrying the activation command is transmitted in slot n, the indicated mapping between TCI states and codepoints of the DCI field 'Transmission Configuration Indication' should be applied starting from the first slot that is after slot $n+[(3N)]\_slot^(subframe,\mu)$. If tci-PresentInDCI is set to "enabled" for the CORESET scheduling the PDSCH, and the time offset between the reception of the DL DCI and the corresponding PDSCH is equal to or greater than timeDurationForQCL, if applicable, after a UE receives an initial higher layer configuration of TCI states and before reception of the activation command, the UE may assume that the DM-RS ports of PDSCH of a serving cell are quasi co-located with the search space (SS)/physical broadcast channel (PBCH) block determined in the initial access procedure with respect to 'QCL-TypeA', and when applicable, also with respect to 'QCL-TypeD'.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold timeDurationForQCL, if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission.

If the tci-PresentInDCI is set as 'enabled', the TCI field in DCI in the scheduling component carrier points to the activated TCI states in the scheduled component carrier or DL BWP and when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the reference signal(s) (RS(s)) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling, the UE expects tci-PresentInDci is set as 'enabled' for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL.

For both the cases when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter (s) used for PDCCH quasi co-location indication of the CORESET associated with a monitored search space with the lowest CORESET-ID in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If none of configured TCI states for the serving cell of scheduled PDSCH contains 'QCL-TypeD', the UE shall obtain the other QCL assumptions from the indicated TCI states for its scheduled PDSCH irrespective of the time offset between the reception of the DL DCI and the corresponding PDSCH.

For a periodic CSI-RS resource in a NZP-CSI-RS-ResourceSet configured with higher layer parameter trs-Info, the UE shall expect that a TCI-State indicates one of the following quasi co-location type(s):

'QCL-TypeC' with an SS/PBCH block and, when applicable, 'QCL-TypeD' with the same SS/PBCH block, or 'QCL-TypeC' with an SS/PBCH block and, when applicable, 'QCL-TypeD' with a CSI-RS resource in an NZP-CSI-RS-ResourceSet configured with higher layer parameter repetition, or For an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE shall expect that a TCI-State indicates one of the following quasi co-location type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with an SS/PBCH block, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE shall expect that a TCI-State indicates one of the following quasi co-location type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE shall expect that a TCI-State indicates one of the following quasi co-location type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

Select portions of TS 38.321 provide, as follows.

TCI State Indication Aspects from TS 38.321

The network may activate and deactivate the configured TCI states for PDSCH of a Serving Cell by sending the TCI States Activation/Deactivation for UE-specific PDSCH MAC CE described in clause 6.1.3.14. The configured TCI states for PDSCH are initially deactivated upon configuration and after a handover.

The MAC entity shall:

1>if the MAC entity receives a TCI States Activation/ Deactivation for UE-specific PDSCH MAC CE on a Serving Cell:

2>indicate to lower layers the information regarding the TCI States Activation/Deactivation for UE-specific PDSCH MAC CE.

The TCI States Activation/Deactivation for UE-specific PDSCH MAC CE is identified by a MAC subheader with LCD as specified in Table 6.2.1-1. It has a variable size consisting of following fields:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

R: Reserved bit, set to 0.

FIG. 3 illustrates a table 300, which identifies the structure of the transmission configuration indicator states activation/deactivation for user equipment specific physical downlink shared channel medium access control-control entity, identified in 3GPP technical specification 38.321, and corresponds more specifically to a figure identified in section 6.1.3.14.

If a UE is configured with TCI reception in DCI (e.g., RRC parameter tci-PresentInDCI), the UE receives an activation command, used to map up to 8 TCI states to the codepoints of the DCI field 'Transmission Configuration Indication'. The activation command is sent via a MAC-CE (a PDSCH can contain MAC-CE). The PDSCH carrying the MAC-CE can be scheduled via a PDCCH transmitted in a time/frequency resources configured for a CORESET (such as one corresponding to RRC parameter ControlResourceSet in 3GPP TS 38.331). There is an application delay from the HARQ-ACK transmission corresponding to the MAC-CE, wherein the UE assumes the subset of TCI states are indicatable via TCI filed in DCI.

TCI can indicate PDSCH DMRS is quasi-collocated with one or more reference signals, each of the reference signals quasi-collocated with one or more large scale channel properties (e.g., in terms of average delay spread/Doppler spread/shift, average delay/gain, transmission beam/spatial Rx parameters). Different reference signals of the one or more reference signals can have different quasi-collocation types indicating quasi-collocation with a set of large scale channel properties. The reference signals can be CSI-RS, SSB (synchronization signal block), UL RS (e.g., SRS resource, PUCCH DMRS, PUSCH DMRS, PRACH) that is quasi co-located with the PDSCH DMRS. A TCI indication can help the UE receive the PDSCH and in PDSCH decoding (e.g., time/frequency synchronization, receive (rx) beam selection corresponding to transmission beam used, etc.).

An antenna port is defined such that the channel over which a symbol on the antenna port is conveyed can be inferred from the channel over which another symbol on the same antenna port is conveyed.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameter. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}.

Spatial Rx parameters may include one or more of: angle of arrival (AoA), Dominant AoA, average AoA, angular spread, Power Angular Spectrum (PAS) of AoA, average AoD (angle of departure), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

UL Configured Grant

A UE can be configured to receive in Downlink (DL) operation or transmit in Uplink (UL) operation in determined time instances according to higher layer configured parameters, such as periodicity of data transmissions parameters. In DL, semi-persistent scheduling can be activated/deactivated via a Physical Downlink Control Channel (PDCCH) associated with Configured Scheduling (CS)-Radio Network Temporary Identifier (RNTI). Upon reception of the activation command, the UE starts receiving DL data, such as Physical Downlink Shared Channel (PDSCH) transmissions in time-periodic time-frequency resources indicated via activation Downlink Control Information (DCI). A Hybrid Automatic Repeat Request (HARD) process number is determined from the time PDSCH starts according to a formula.

In the UL direction, there are two types of UL transmissions without a dynamic grant: Type I, and Type II. Type II is very similar to Semi-Persistent Scheduling (SPS) operation in DL. However, type I uses Radio Resource Control (RRC)-based UL grant, such as with no activation DCI.

UL Configured Grant (CG) operation aims at reducing the latency, as a Scheduling Request (SR) procedure is bypassed, and reducing overhead, as DCI is not sent for each transmission occasion. To increase the reliability of CG operation, the UE can be configured to repeat the transmission repK, such as, for example, repK=1, 2, 4, or 8, times. According to Third Generation Partnership Project (3GPP) Technical Specification (TS) 38.214 Rel-15, when the UE is configured with repK>1, the UE shall repeat a Transport Block (TB) across the repK consecutive slots applying the same symbol allocation in each slot.

According to TS 38.321 Rel-15, section 5.4.1, for each serving cell and each configured uplink grant, if configured and activated, the Medium Access Control (MAC) entity shall:

1> if the Physical Uplink Shared Channel (PUSCH) duration of the configured uplink grant does not overlap with the PUSCH duration of an uplink grant received on the PDCCH for this serving sell:

2>set the HARQ Process Identifier (ID) to the HARQ Process ID associated with this PUSCH duration;

2> if the configuredGrantTimer for the corresponding HARQ process is not running:

3>consider the New Data Indicator NDI bit for the corresponding HARQ process to have been toggled;

3>deliver the configured uplink grant and the associated HARQ information to the HARQ entity.

The configuredGrantTimer can take values from 1 to 64 in number of periodicities as provided in the IE ConfiguredGrantConfig.

Transmission Occasion for Initial Tb Transmission

According to TS 38.214:

The higher layer configured parameters repK and repK-RV define the K repetitions to be applied to the transmitted transport block, and the redundancy version pattern to be applied to the repetitions. If the parameter repK-RV is not provided in the configuredGrantConfig, the redundancy version for uplink transmissions with a configured grant shall be set to 0. Otherwise, for the nth transmission occasion among K repetitions, n=1, 2, . . . , K, it is associated with $(\mathrm{mod}(n-1,4)+1)$th value in the configured RV sequence. The initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K=8.

Each redundancy version corresponds to a set of coded bits representing the same set of information bits of a TB (e.g. RV0 corresponds to a first set of coded bits and RV1 corresponds to a second set of coded bits, and so on).

UL Cancelation Indication

An enhanced mobile broadband (eMBB) UE can receive an uplink cancelation indication (ULCI) indicating a part of its UL transmission should be canceled.

Dynamic multiplexing between eMBB and URLLC traffic in the DL was specified in Rel-15 standard specifications. Many aspects of ULCI is expected to be similar to Rel 15 DL PI:

For downlink pre-emption indication (DLPI), DCI format 2_1 is used for notifying the PRB(s) and OFDM symbol(s) where UE may assume no transmission is intended for the UE.

The following information is transmitted by means of the DCI format 2_1 with CRC scrambled by INT-RNTI:

Pre-emption indication 1, Pre-emption indication 2, . . . , Pre-emption indication N.

The size of DCI format 2_1 is configurable by higher layers up to 126 bits, according to Subclause 11.2 of [TS 38.213]. Each pre-emption indication is 14 bits.

Interpretation of the 14-bit bitmap is configurable: each bit represents either of one OFDM symbol in the time domain and the full bandwidth part in frequency domain, or two OFDM symbols in the time domain and one half of the bandwidth part in frequency domain.UE behavior upon DLPI reception is undefined.

As opposed to DLPI where number of resource blocks (RBs) in frequency domain can change abruptly from one symbol to another symbol, in uplink pre-emption indication (ULPI), such abrupt changes are not desired because of radio frequency (RF) limitations. Also, ULPI is different than DLPI as it is used to avoid UL interference, whereas in DL, gNB has already avoided the DL interference by selecting one out of interfering DL transmissions.

UL cancelation (pre-emption) of an enhanced mobile broadband (eMBB) PUSCH transmission has been proposed as a candidate for inter UE multiplexing (e.g., eMBB traffic of UE1 and URLLC traffic of UE2) by several companies. The scheme has advantage of ensuring latency (and reliability) of the URLLC traffic by timely muting the eMBB traffic of another UE. The scheme can also be advantageous to eMBB UEs by letting them be scheduled over a wide bandwidth (instead of semi-static bandwidth split between URLLC UEs and eMBB UEs) and only get muted if needed. However, there are costs and disadvantages associated with the scheme: (a) The UL cancelation indication (if explicitly indicated) needs to be monitored quite frequently (at least when the UE has unacknowledged UL eMBB transmission or configured wideband SRS transmission) in a timely manner to be helpful in ensuring latency of URLLC UEs (b) the UL cancelation indication should have a high reliability (c) UL cancelation indication can incur control overhead (d) there could be eMBB UEs in a cell that are not capable of performing UL cancelation operation, which could hurt the URLLC performance if overlap. UL cancelation has been proposed with different flavors: for instance, completely canceling eMBB PUSCH, resuming eMBB PUSCH after canceling a part of PUSCH, pausing eMBB PUSCH for a period or rescheduling eMBB PUSCH.

The following is recently agreed for UL CI in 3GPP:

Agreements:

Regarding UL CI monitoring, support the following:

A new RNTI (e.g. CI-RNTI) is used for UL CI for further study (FFS): Monitoring periodicity larger than [5] slot is not supported for UL CI The aggregation level(s) and the number of PDCCH candidates configured by RRC FFS possible restrictions, e.g., the ones associated with SFI The DCI payload size for UL CI is configured by RRC FFS possible values Agreements:

SRS can be canceled by UL CI

PUCCH cannot be canceled by UL CI

RACH related UL transmissions cannot be canceled by UL CI, including MSG ⅓ in case of 4-step RACH, MSG A in case of 2-step RACH.

Agreements:

Cross-carrier UL cancelation indication is supported using the same way as Rel-15 SFI/DL PI The indication field position in DCI for each cross-carrier indicated serving cell is configured by RRC Agreements:

Different UE processing time capability for UL CI (i.e. shorter or longer than T_proc2 for cap #2 UE) is not considered in Rel-16

$d_{2,1}$=0 also when DMRS and UL-SCH (for the PUSCH to be canceled) are multiplexed in the $1^{st}$ symbol Agreements:

In case of PUSCH repetitions, UL CI is applied to each repetition individually (actual repetition in case of Rel-16 PUSCH repetition) that overlaps with the resource (in time and frequency) indicated by UL CI.

Agreements:

The reference time region where a detected UL CI is applicable is determined by the following:

The reference time region starts from X symbols after the ending symbol of the PDCCH CORESET carrying the UL CI, where X is at least equal to the minimum processing time for UL cancelation FFS X can be configured to be larger than the minimum processing time for UL cancelation The duration of the reference time region is configured by RRC FFS Possible values (e.g. 2OS, 4OS, 7OS, 14OS, 28OS?)

FFS DL symbols are excluded from the reference time region

Agreements:

The reference frequency region where a detected UL CI is applicable is configured by RRC Agreements:

Support the following for UL CI

Each UL cancelation indicator per serving cell has a RRC configurable field size of X bits One value of X is 14

FFS other values (e.g. X can be N (N>0) times of 7)

The time domain granularity for the reference time region is configured by RRC

FFS the possible values (e.g. the time region can be divided into [1], [2], [4], [7], [14], . . . portions)

FFS valid configurations according to the duration of the time reference region

The frequency domain granularity is determined based on the configured time domain granularity and the configured bit field size of each indicator The time and frequency resource for cancellation is jointly indicated by a 2D-bitmap (i.e. similar as DL PI) over the time and frequency partitions within the reference region FFS dynamic 2D-bitmap

REL-16 Configured Grant

Multiple-Active Configured Grant (CG) Operation

To reduce the latency of the CG operation in case a transport block (TB) is repeated multiple times (e.g., in multiple TTIs or in multiple transmission occasions in a transmission/repetition bundle), it is proposed that a UE can have/use multiple simultaneously active semi persistent scheduling (SPS)/grant free (GF) configurations on the same serving cell.

Figure 2:
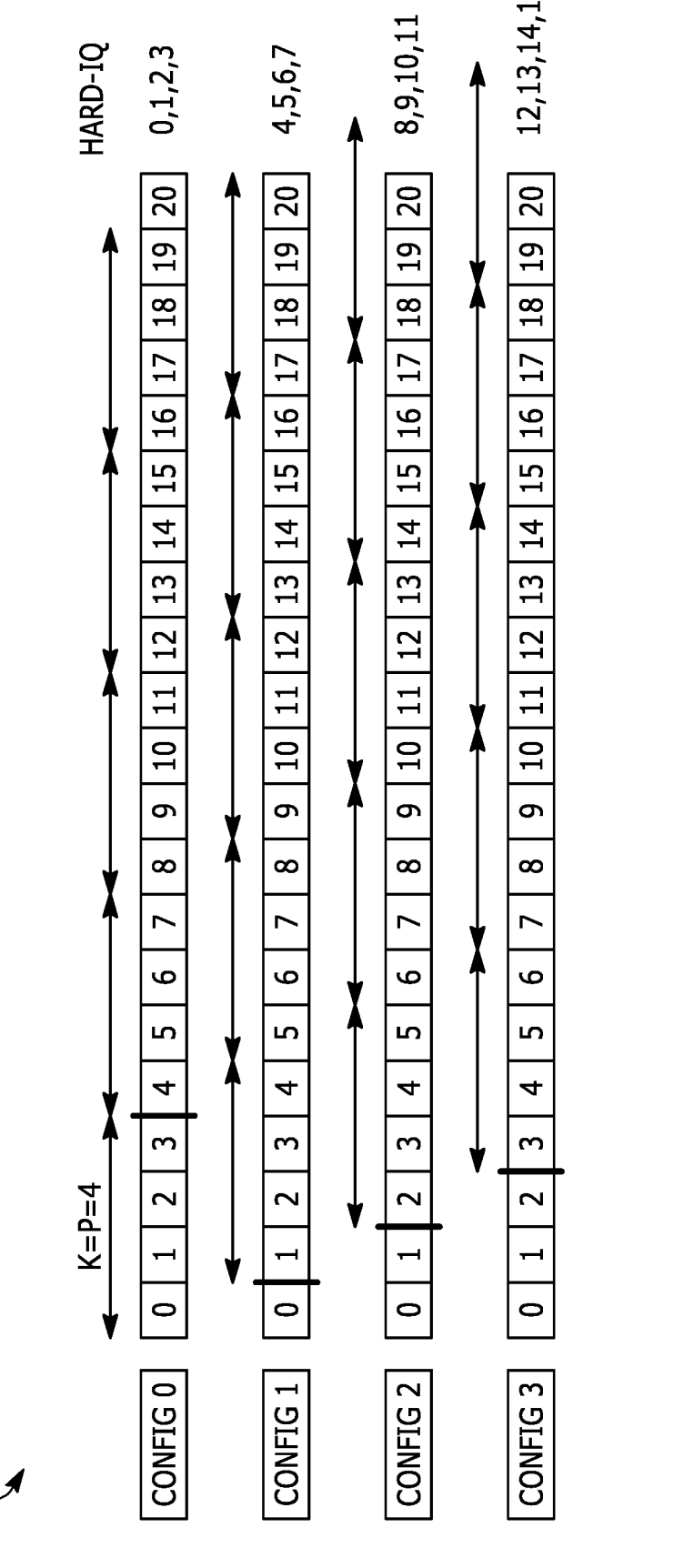
FIG. 2 is a chart, which illustrates four potential configured grant configurations, which can be simultaneously active for the user equipment.

For instance, assuming K=P=4 TTIs, and having K configurations, each offset by one transmission time interval (TTI), the UE will be able to start UL transmission repetition bundle in each TTI via choosing the appropriate CG configuration (see FIG. 2). More specifically FIG. 2 illustrates a chart 200, which includes four potential configured grant configurations, which can be simultaneously active for the user equipment. The UE chooses the configuration for transmission of a TB based on the TB arrival: for instance, if data can be transmitted in TTI 0, the UE would choose configuration 0, if data is ready to be transmitted in TTI1, the UE would choose configuration 1, and so on. The hybrid automatic repeat request (HARD) processes are distributed among the configurations. To help gNB distinguish which configuration is used, different DMRSs (e.g., such as different DMRS sequences) can be used for different configurations.

Recent 3GPP developments for UL Configured grant

In 3GPP it is agreed that:

In case of PUSCH repetitions, UL CI is applied to each repetition individually (actual repetition in case of Rel-16 PUSCH repetition) that overlaps with the resource (in time and frequency) indicated by UL CI.

For CG PUSCH,

Introduce the RRC signaling per CG configuration to enable/disable the feature of starting from any RV0 occasion for RV cyclic sequences {0,0,0,0} and {0,3,0,3}.

If disabled, Rel-16 behavior

If enabled, reuse Rel-15 behavior

Rel-16 behavior enables initial transmission of a TB only from the beginning of a period.

In accordance with at least some embodiments of the present application a TCI Indication can be supported. For example, one simple way to determine the active TCI state set (from which DCI indicates one TCI for each scheduled PDSCH) is to send separate MAC-CEs—one MAC-CE corresponding to eMBB (DCI format 1-1) and one MAC-CE corresponding to URLLC (DCI format 1-2). However, due to application delay of MAC-CE, such a scheme could lead to additional delay for URLLC operation in case a MAC-CE is already received for the same CORESET scheduling DCI formats 1-1 and 1-2 considering the PDSCH beams (TCI states) are probably the same for eMBB and URLLC (or maybe URLLC beams are a subset of eMBB beams, e.g., subset comprising the top K beams (K<# of eMBB DCI 1-1 beams) to reduce DCI signaling). Alternatively, a MAC-CE sent via DCI format 1-2 is probably more reliable and can be useful for eMBB operation as well. Hence, in the following, we propose to send a single MAC-CE for TCI set activation (either via DCI format 1-1 or DCI format 1-2), and derive the set of TCI states for eMBB PDSCH and URLLC PDSCH according to the MAC-CE.

1) In an embodiment, the UE upon reception of an indication in a MAC-CE, maps up to 8 TCI states to the codepoints of the DCI field 'Transmission Configuration Indication' in DCI format 1-1 and up to $2^W$ (W<3) TCI states to the codepoints of the DCI field 'Transmission Configuration Indication' in DCI format 1-2 if 'W' bits are configured for TCI field size of DCI format 1-2.

a. In one embodiment, the MAC-CE indicates two bitmaps, wherein each bitmap indicates which TCI states can be mapped to codepoint of a DCI format:

i. one first bitmap applicable to a first set of DCI formats (e.g., DCI format 1-1), and ii. one second bitmap applicable to a second set of DCI formats (e.g., DCI format 1-2).

In one example, the UE is configured with a set of TCI states. In one example, the number of bits in the first bitmap is equal to the number of TCI states in the set of TCI states. The UE is activated a first set of TCI states with a first maximum number of activated TCI states, (e.g., maximum 8 TCI states) from the set of TCI states by the first bitmap for the first set of DCI formats. The number of bits in the second bitmap may be equal to the first maximum number of activated TCI states. The actual number of activated TCI states in the bitmap may be less than the maximum number of activated TCI states. In one example, the number of bits in the first bitmap may be less than the number of TCI states of the set of TCI states. The number of activated TCI states in the first bitmap may be less than the number of bits in the first bitmap. The activated TCI states in the second bitmap corresponding to the second set of DCI formats may be a subset of the activated TCI states in the first bitmap corresponding to the first set of DCI formats.

In one example, the first bitmap can have a first bitmap size/length and the second bitmap can have a second bitmap size/length. The first bitmap size (number of bits in bitmap) may be a first size with a first maximum number of TCI states associated with the first set of DCI formats. The first maximum number of TCI states may be the number of TCI states in the set of TCI states which the UE is configured. The second bitmap size (number of bits in bitmap) may be a second size with a second maximum number of TCI states associated with the second set of DCI formats. The second size may be smaller than the first size. The second maximum number of TCI states may be smaller than the first maximum number of TCI states.

The actual bitmap size may be larger in order to make byte (octet)-aligned MAC messages with the additional bit fields reserved. A bit field Ti in the bitmap is set to 1 to indicate that the TCI state with TCI-StateId i shall be activated and mapped to the codepoint of the DCI Transmission Configuration Indication field of the associated set of DCI formats. The $T_i$ field is set to 0 to indicate that the TCI state with TCI-StateId i shall be deactivated and is not mapped to the codepoint of the DCI Transmission Configuration Indication field of the associated set of DCI formats.

b. In one embodiment, the MAC-CE indicates a first bitmap wherein the bitmap indicates which TCI states can be mapped to codepoint of a first DCI format. The UE determines which TCI states can be mapped to codepoint of the $2^{nd}$ DCI format based on the first bitmap and based on a rule.

i. e.g., the rule states the first/last $2^W$ activated TCI states of the bitmap (ones with bi set to '1') applicable to the $2^{nd}$ DCI format.

c. In one embodiment, the MAC-CE indicates a first bitmap wherein the bitmap indicates which TCI states can be mapped to codepoint of a first DCI format. The UE determines which TCI states can be mapped to codepoint of the $2^{nd}$ DCI format based on the first bitmap and a higher layer parameter.

i. The higher layer parameter can be indicated via RRC or a field in the MAC-CE (e.g., starting/ending index, hopping index (every 'X' activated TCI states of the bitmap))

2) In an embodiment, the UE upon reception of an indication in a MAC-CE, maps up to a. 8 TCI states to the codepoints of the DCI field 'Transmission Configuration Indication' in DCI format 1-1 if the MAC-CE indicates it is applicable to DCI format 1-1 (e.g., MAC-CE indicates the DCI format)

b. up to $2^W$ (W<3) TCI states to the codepoints of the DCI field 'Transmission Configuration Indication' in DCI format 1-2 if 'W' bits are configured for TCI field size of DCI format 1-2 if the MAC-CE indicates it is applicable to DCI format 1-1

Transmission Occasion for Initial TB Transmission

If a UE receives an UL CI (cancelation indicator) indicating resources including symbols of a 1st TO (transmission occasion) of the K repetition of a configured grant, the initial transmission of a transport block may start at any of the transmission occasions of the K repetitions of the same period that are associated with RV=0 (similar to Rel15 behavior).

3) In an embodiment if a UE receives an UL CI indicating resources including symbols of a 1st TO (transmission occasion) of the K repetition of a configured grant, the initial transmission of a transport block may start at Alt1: the first transmission occasion of another K repetitions corresponding to RV0 if the number of remaining TOs in the K repetition (after cancelation) is smaller than a threshold (otherwise the first valid TO (e.g., not canceled) of the K repetition corresponding to RV0)

Threshold determined based on at least one of
    An RRC parameter
    the number of configured repetitions
Another K repetitions determined to be transmission occasions of a
    Alt1: next period of same CG (as the CG)
    Alt2: another CG in case multiple CG configurations are active
    Alt3: another CG if ULCI is sent early enough (e.g., 'T' seconds, 'T' can be a fraction of a second, 'T' can be related to processing timeline such as Tpoc,2 defined in TS 38.214, section 6.4) prior to the first TO of the another CG period; otherwise next period of same CG.

Alt2: the first transmission occasion of another K repetitions if the UE is disabled (by RRC signaling for the CG configuration) the feature of starting from any RV0 occasion for RV cyclic sequences {0,0,0,0} and {0,3,0,3}

FIG. 4 illustrates a flow diagram 400 of a method in a user equipment. The method includes receiving 402 an activation command, which indicates a first set of transmission configuration indicator states to select between, and which are to be used with transmissions scheduled using a first downlink control information format. A number of states included in the first set corresponds to a selection field associated with the first downlink control information format having a first size, which corresponds to a number of discrete entries that the selection field having the first size is capable of selecting between. A second set of transmission configuration indicator states to select between, which are to be used with transmissions scheduled using a second downlink control information format can be determined 404. A number of states included in the second set corresponds to a selection field associated with the second downlink control information format having a second size, where the second size is different than the first size, which corresponds to a number of discrete entries that the selection field having the second size is capable of selecting between. Transmissions scheduled using the second downlink control information format, which use a selected one of the transmission configuration indicator states included in the second set can be received 406.

In some instances, the size of the selection field can be associated with the second downlink control information format having the second size is smaller than the size of the selection field associated with the first downlink control information format having the first size, so as to enable the selection field associated with the second downlink control information format to distinguish between fewer associated transmission configuration indicator states than the selection field associated with the first downlink control information format.

In some instances, the number of discrete entries that the selection field is capable of selecting between can correspond to a number of entries equal to two raised to a power W, where W is a number of bits in the respective selection field.

In some instances, the second set of transmission configuration indicator states can be a subset of the first set of transmission configuration indicator states.

In some instances, the transmission configuration indicator states indicated in the activation command are each respectively mapped to a corresponding position associated with a predefined ordered arrangement within the first set. In some of these instances, the particular transmission configuration indicator states included in the second set can correspond to a particular predetermined subgrouping of transmission configuration indicator states from the first set based upon the corresponding position within the first set. Further, the particular predetermined subgrouping of transmission configuration indicator states from the first set, that are included in the second set can be identified in a predetermined bitmap. Still further, the predetermined bitmap can be indicated as part of a medium access control-control element.

In some instances, the second set can include the transmission configuration indicator states beginning with the first K number of states from the first set, where K is equal to the number of states that can be distinguished using the selection field having the second size associated with the second downlink control information format.

In some instances, the transmissions scheduled using the second downlink control information can be received via a physical downlink shared channel.

In some instances, the second downlink control information can be received via a physical downlink control channel.

In some instances, the activation command can be received as part of a medium access control-control element.

In some instances, use of the second downlink control information format can be associated with ultra reliable low latency communications.

FIG. 5 illustrates a flow diagram 500 of a method in a network entity. The method includes sending 502 an activation command to a particular user equipment indicating a first set of transmission configuration indicator states to select between, which are to be used with transmissions scheduled using a first downlink control information format. A number of states included in the first set corresponds to a selection field associated with the first downlink control information format having a first size, which corresponds to a number of discrete entries that the selection field having the first size is capable of selecting between. A second set of transmission configuration indicator states to select between, which are to be used with transmissions scheduled for the particular user equipment using a second downlink control information format can be identified 504. A number of states included in the second set corresponds to a selection field associated with the second downlink control information format having a second size, where the second size is different than the first size, which corresponds to a number of discrete entries that the selection field having the second size is capable of selecting between. Transmissions scheduled for the particular user equipment using the second downlink control information format can be sent 506 using a selected one of the transmission configuration indicator states included in the second set.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 6:
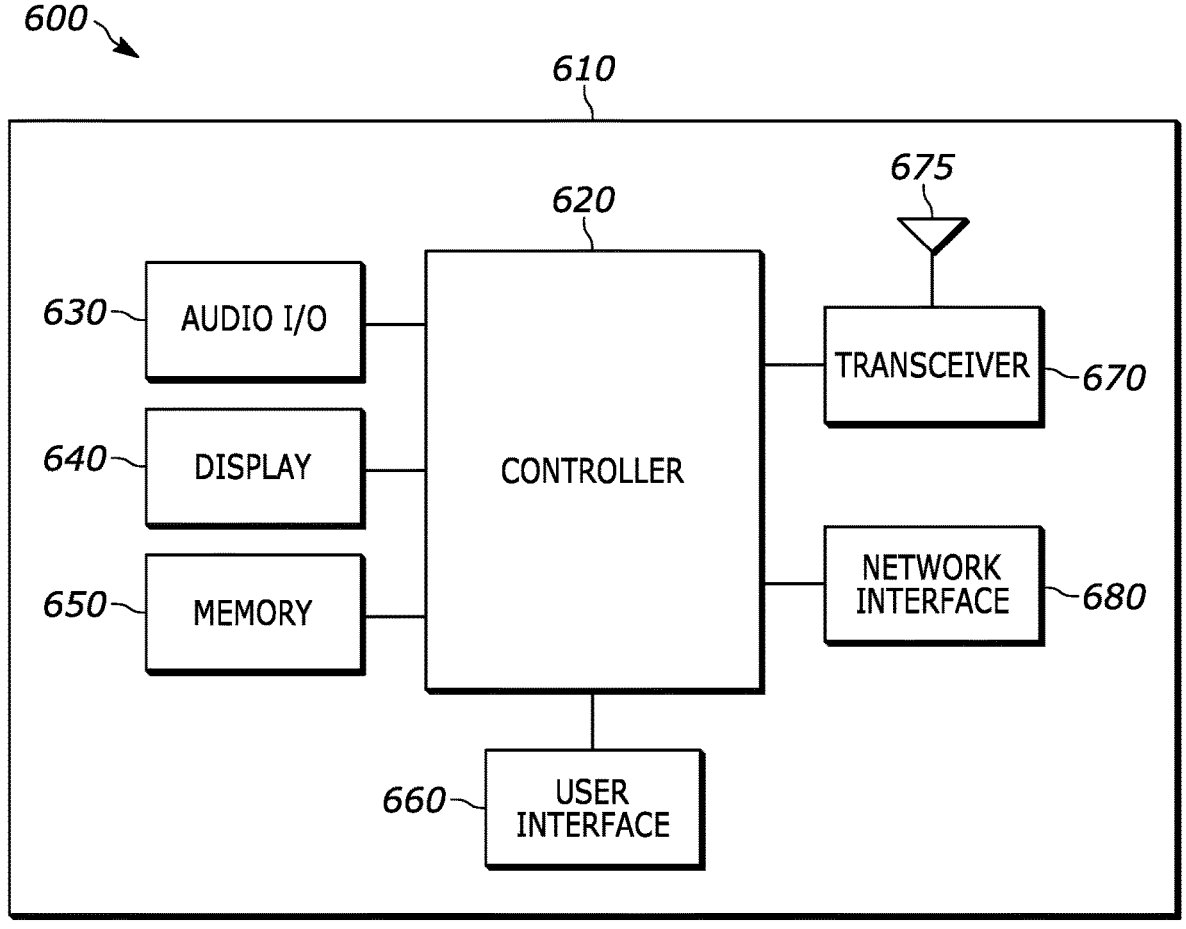
FIG. 6 is an example block diagram of an apparatus according to a possible embodiment.

FIG. 6 is an example block diagram of an apparatus 600, such as the user equipment 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements and/or may include additional elements for different embodiments of the present disclosure. The apparatus 600 can perform the methods described in all the embodiments The display 640 can be a viewfinder, a liquid crystal display (LCD), a light emitting diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a random access memory (RAM), a read only memory (ROM), an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 650 or elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller 620 may perform some or all of the disclosed operations. For example, some operations can be performed using cloud computing and the controller 620 may perform other operations. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims.

Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
receiving an activation command indicating a first set of transmission configuration indicator (TCI) states to select between for use with transmissions scheduled using a first downlink control information (DCI) format, wherein a first number of TCI states included in the first set of TCI states corresponds to a first selection field associated with the first DCI format and having a first size, the first size corresponding to a first number of discrete entries of the first selection field;
determining a second set of TCI states to select between for use with transmissions scheduled using a second DCI format, wherein a second number of TCI states included in the second set of TCI states corresponds to a second selection field associated with the second DCI format and having a second size different than the first size, the second size corresponding to a second number of discrete entries of the second selection field; and
receiving transmissions scheduled using the second DCI format using a TCI state selected from the second set of TCI states,
wherein the second set of TCI states includes TCI states beginning with a first K number of TCI states from the first set of TCI states, wherein K is equal to the second number of TCI states that can be distinguished using the second selection field having the second size and associated with the second DCI format.

2. The method of claim 1, wherein the second size is smaller than the first size, the second number of TCI states is less than the first number of TCI states, and the second selection field is associated with fewer TCI states than the first selection field.

3. The method of claim 1, wherein each of the first number of discrete entries and the second number of discrete entries corresponds to a respective number of entries equal to two raised to a power W, where W is a number of bits in each of the first selection field and the second selection field.

4. The method of claim 1, wherein the second set of TCI states is a subset of the first set of TCI states.

5. The method of claim 1, wherein each TCI state in the first set of TCI states indicated in the activation command is respectively mapped to a corresponding position associated with a predefined ordered arrangement within the first set.

6. The method of claim 5, wherein the TCI states included in the second set of TCI states correspond to a predetermined subgrouping of TCI states from the first set of TCI states based upon the corresponding position within the first set.

7. The method of claim 6, wherein the predetermined subgrouping of TCI states from the first set of TCI states that are included in the second set of TCI states are identified in a predetermined bitmap.

8. The method of claim 7, further comprising receiving a medium access control-control element (MAC-CE) that includes an indication of the predetermined bitmap.

9. The method of claim 1, further comprising receiving the transmissions scheduled using the second DCI format via a physical downlink shared channel (PDSCH).

10. The method of claim 1, further comprising receiving a DCI having the second DCI format via a physical down-link control channel (PDCCH).

11. The method of claim 1, further comprising receiving the activation command as part of a medium access control-control element (MAC-CE).

12. The method of claim 1, wherein use of the second DCI format is associated with ultra reliable low latency communications.

13. The method of claim 1, wherein the determining comprises:

mapping the first set of TCI states to a first set of codepoints of the first selection field associated with the first DCI format; and mapping the second set of TCI states to a second set of codepoints of the second selection field associated with the second DCI format.

14. The method of claim 13, further comprising:

receiving a first DCI message having the first DCI format, wherein the first DCI message schedules an eMBB PDSCH transmission, and wherein a value of the first selection field included in the first DCI message indi-cates a first TCI state from the first set of TCI states;

receiving the eMBB PDSCH transmission according to the first TCI state based at least in part on the mapping of the first set of TCI states to the first set of codepoints;

receiving a second DCI message having the second DCI format, wherein the second DCI message schedules a URLLC PDSCH transmission, and wherein a value of the second selection field included in the second DCI message indicates a second TCI state from the second set of TCI states; and receiving the URLLC PDSCH transmission according to the second TCI state based at least in part on the mapping of the second set of TCI states to the second set of codepoints.

15. The method of claim 1, wherein the second set of TCI states comprises a subset of the first set of TCI states that starts from the beginning of the first set of TCI states.

16. A user equipment (UE) for wireless communication, comprising:

at least one memory; and at least one processor coupled with the at least one memory and configured to cause the UE to:

receive an activation command indicating a first set of transmission configuration indicator (TCI) states to select between for use with transmissions scheduled using a first downlink control information (DCI) format, wherein a first number of TCI states included in the first set of TCI states corresponds to a first selection field associated with the first DCI format and having a first size, the first size corresponding to a first number of discrete entries of the first selection field;

determine a second set of TCI states to select between for use with transmissions scheduled using a second DCI format, wherein a second number of TCI states included in the second set of TCI states corresponds to a second selection field associated with the second DCI format and having a second size different than the first size, the second size corresponding to a second number of discrete entries of the second selection field; and receive transmissions scheduled using the second DCI format using a TCI state selected from the second set of TCI states, wherein the second set of TCI states includes TCI states beginning with a first K number of TCI states from the first set of TCI states, wherein K is equal to the second number of TCI states that can be distin-guished using the second selection field having the second size and associated with the second DCI format.

17. The UE of claim 16, wherein the second size is smaller than the first size, the second number of TCI states is less than the first number of TCI states, and the second selection field is associated with fewer TCI states than the first selection field.

18. The UE of claim 16, wherein each of the first number of discrete entries and the second number of discrete entries corresponds to a respective number of entries equal to two raised to a power W, where W is a number of bits in each of the first selection field and the second selection field.

19. The UE of claim 16, wherein the second set of TCI states is a subset of the first set of TCI states.

20. The UE of claim 16, wherein each TCI state in the first set of TCI states indicated in the activation command is respectively mapped to a corresponding position associated with a predefined ordered arrangement within the first set.

21. A processor for wireless communication, comprising:

at least one controller coupled with at least one memory and configured to cause the processor to:

receive an activation command indicating a first set of transmission configuration indicator (TCI) states to select between for use with transmissions scheduled using a first downlink control information (DCI) format, wherein a first number of TCI states included in the first set of TCI states corresponds to a first selection field associated with the first DCI format and having a first size, the first size corresponding to a first number of discrete entries of the first selection field;

determine a second set of TCI states to select between for use with transmissions scheduled using a second DCI format, wherein a second number of TCI states included in the second set of TCI states corresponds to a second selection field associated with the second DCI format and having a second size different than the first size, the second size corresponding to a second number of discrete entries of the second selection field; and receive transmissions scheduled using the second DCI format using a TCI state selected from the second set of TCI states, wherein the second set of TCI states includes TCI states beginning with a first K number of TCI states from the first set of TCI states, wherein K is equal to the second number of TCI states that can be distinguished using the second selection field having the second size and associated with the second DCI format.

22. The processor of claim 21, wherein the second size is smaller than the first size, the second number of TCI states is less than the first number of TCI states, and the second selection field is associated with fewer TCI states than the first selection field.

\* \* \* \* \*